(12) United States Patent
Lien et al.

(10) Patent No.: US 11,061,485 B2
(45) Date of Patent: Jul. 13, 2021

(54) COMPUTER MOUSE

(71) Applicant: RAZER (ASIA-PACIFIC) PTE. LTD., Singapore (SG)

(72) Inventors: Jian Yao Lien, Singapore (SG); Chang Sern Gwee, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/610,486

(22) PCT Filed: May 3, 2017

(86) PCT No.: PCT/SG2017/050233
§ 371 (c)(1),
(2) Date: Nov. 1, 2019

(87) PCT Pub. No.: WO2018/203825
PCT Pub. Date: Nov. 8, 2018

(65) Prior Publication Data
US 2020/0159344 A1    May 21, 2020

(51) Int. Cl.
*G06F 3/0354* (2013.01)
(52) U.S. Cl.
CPC .................... *G06F 3/03543* (2013.01)
(58) Field of Classification Search
CPC ................. G06F 3/03543; A47B 91/00
See application file for complete search history.

(56) References Cited

U.S. PATENT DOCUMENTS

| | | | |
|---|---|---|---|
| 4,797,665 A | 1/1989 | Ida et al. | |
| 5,381,159 A | 1/1995 | Oohori | |
| 7,009,597 B1 | 3/2006 | Ames | |
| 7,697,283 B2 | 4/2010 | Mathew et al. | |
| 8,184,098 B2 | 5/2012 | Wu | |
| 8,188,974 B2 | 5/2012 | Bidiville et al. | |
| 8,213,177 B2 | 7/2012 | Uttermann et al. | |
| 8,248,368 B2 | 8/2012 | Lin et al. | |
| 8,497,840 B2 | 7/2013 | Zahnert et al. | |
| 2003/0142075 A1 | 7/2003 | Chin | |
| 2003/0201976 A1 | 10/2003 | Huang | |
| 2004/0246232 A1 | 12/2004 | Chang et al. | |
| 2005/0206617 A1 | 9/2005 | Moyer et al. | |
| 2007/0069088 A1* | 3/2007 | Bidiville | G06F 3/03543 248/188.9 |

(Continued)

FOREIGN PATENT DOCUMENTS

| CN | 2509657 Y | 9/2002 |
|---|---|---|
| JP | H07295741 A | 11/1995 |
| KR | 101189106 B1 | 10/2012 |

OTHER PUBLICATIONS

Extended European Search Report dated Jan. 30, 2020, 10 pages, for the corresponding European Patent Application No. 17908606.1.

(Continued)

*Primary Examiner* — Kevin M Nguyen
(74) *Attorney, Agent, or Firm* — Polsinelli PC (57) ABSTRACT

A mouse for communication with a processor-based device. The mouse may include a housing having a base portion. The mouse may further include a layer of metal coupled to the base portion. The layer of metal may be connected to an electric reference potential.

12 Claims, 6 Drawing Sheets

(56) References Cited

U.S. PATENT DOCUMENTS

| | | | |
|---|---|---|---|
| 2007/0098228 A1* | 5/2007 | Perreault | G06K 9/00053 |
| | | | 382/115 |
| 2009/0009474 A1 | 1/2009 | Delattre | |
| 2011/0001702 A1 | 1/2011 | Wu | |
| 2011/0074684 A1 | 3/2011 | Abraham et al. | |
| 2013/0194185 A1 | 8/2013 | McLoughlin et al. | |
| 2015/0234484 A1* | 8/2015 | Winter | G06F 3/0395 |
| | | | 345/163 |

OTHER PUBLICATIONS

International Search Report and Written Opinion, dated Jan. 29, 2018, for the corresponding International Application No. PCT/SG2017/050233 in 11 pages.

* cited by examiner

COMPUTER MOUSE

TECHNICAL FIELD

Embodiments generally relate to a computer mouse.

BACKGROUND

A computer mouse currently available in the market usually has mouse feet that are made of "self-lubricating" material, such as Polytetrafluoroethylene (PTFE), or commonly known as Teflon. The mouse feet are stuck or attached to the bottom side of the computer mouse using adhesive. The "self-lubricating" properties of the mouse feet enable the computer mouse to glide smoothly over mouse pads or any other appropriate trackable surfaces. However, due to the thickness of each mouse foot and the adhesive layer, the respective mouse foot adhering to the bottom case cover has a distinctive step contour. The edge of the adhesive layer is also exposed right in between the surface of the bottom case cover and the respective mouse foot.

The step contour of the respective mouse foot is prone to trapping dust. Further, the exposed edge of the adhesive layer is prone to causing dust to stick on making it hard to clean the dust from the exposed edge of the adhesive layer unless solvents such as alcohol are used. Dust affects the movement of the computer mouse and users may find that the computer mouse with mouse feet affected by dust no longer glides as smoothly as before.

SUMMARY

According to various embodiments, there is provided a mouse for communication with a processor-based device. The mouse may include a housing having a base portion. The mouse may further include a layer of metal coupled to the base portion. The layer of metal may be connected to an electric reference potential.

According to various embodiments, there is provided a mouse for communication with a processor-based device. The mouse may include a housing having a base portion. The mouse may further include a plurality of mouse foot protrusions integrally molded with the housing and forming a portion of the base portion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments of a computer mouse have been provided to address at least some of the issues identified earlier.

Various embodiments provide a mouse for communication with a processor-based device, such as a computer mouse, that may minimise dust trapping at the mouse foot.

Various embodiments provide a mouse for communication with a processor-based device, such as a computer mouse, that may allow dust to be cleaned off very easily even if dust does accumulate at the mouse foot.

Figure 1A:
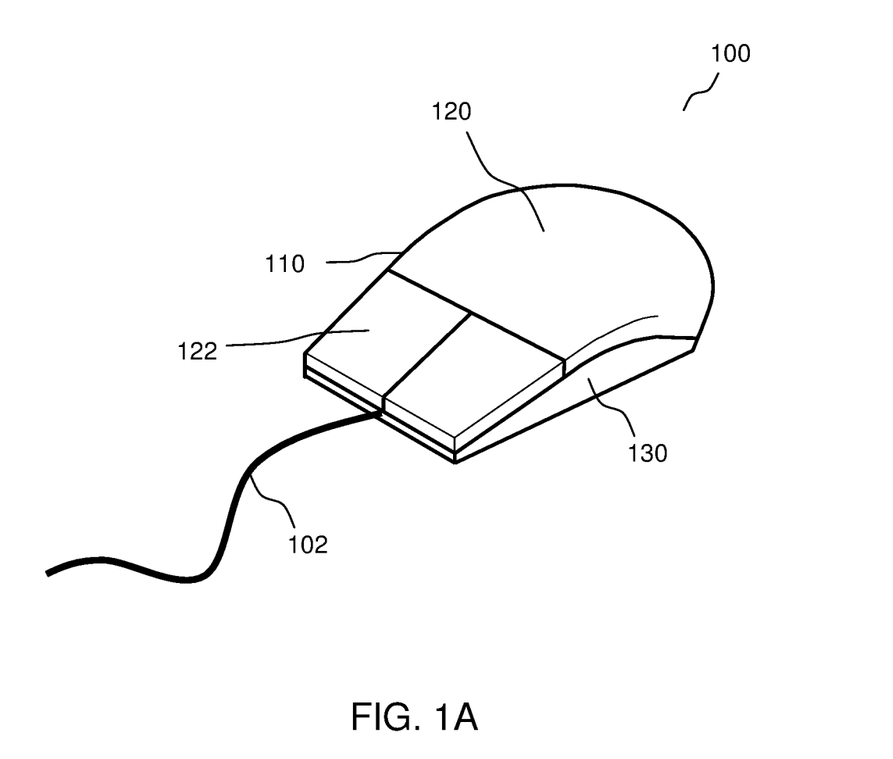
FIG. 1A shows an assembled view of a mouse for communication with a processor-based device according to various embodiments.
Figure 1B:
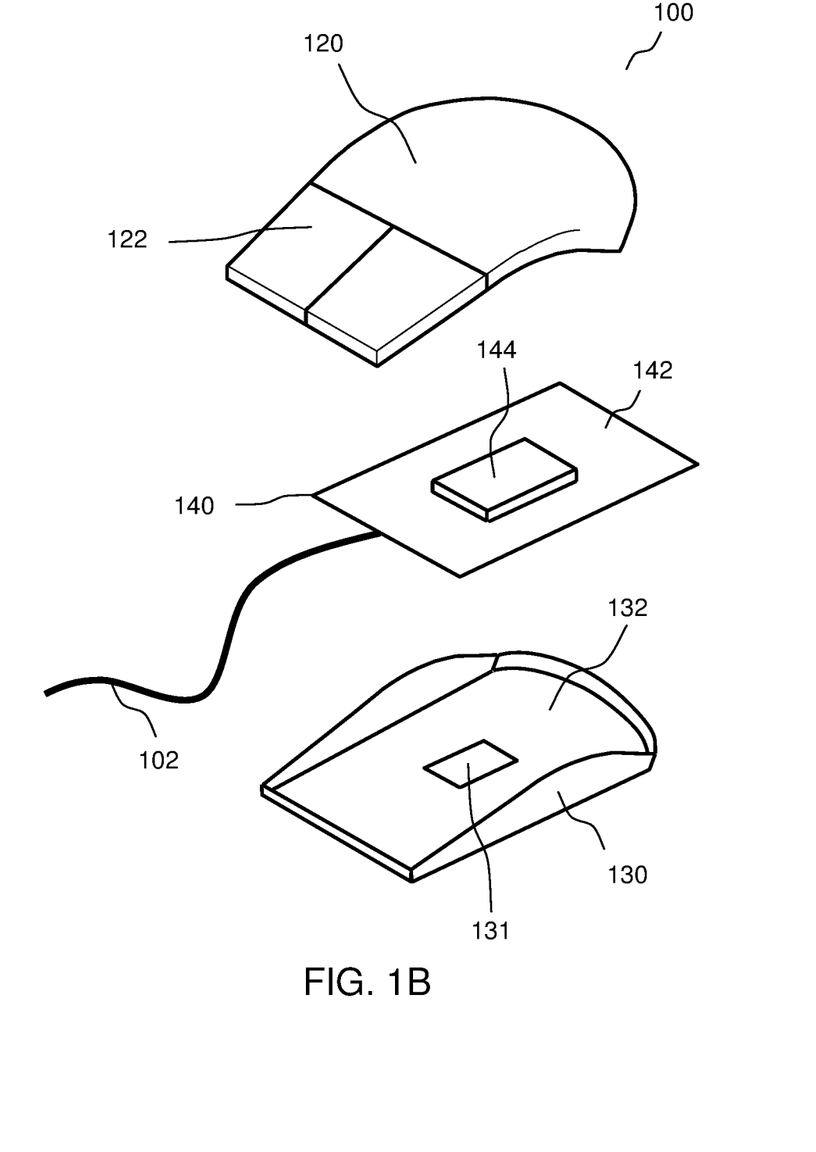
FIG. 1B shows an exploded view of the mouse of FIG. 1A according to various embodiments.

FIG. 1A shows an assembled view of a mouse 100 for communication with a processor-based device according to various embodiments. FIG. 1B shows an exploded view of the mouse 100 of FIG. 1A according to various embodiments. As shown, the mouse 100 may include a housing 110. The housing 110 may be an exterior casing of the mouse 100. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components 140 of the mouse 100.

According to various embodiments, the internal components 140 of the mouse 100 may include an electronic circuit module 142 and a motion detection module 144. The electronic circuit module 142 may include printed circuit boards, or any other suitable electronic circuit. The electronic circuit module 142 may be connected to the processor-based device, such as a computer, via a cable 102. The motion detection module 144 may include optical sensors, or laser sensors, or track ball mechanism, or any other electronic or mechanical components that may be configured to detect movement of the mouse 100. The motion detection module 144 may further be configured to be in communication with the electronic circuit module 142 such that the detected movement of the mouse may be transmitted to the processor-based device, which the mouse 100 may be connected to.

Further, the cover portion 120 of the housing 110 may include one or more buttons 122. The one or more buttons 122 may be configured to interact with the electronic circuit module 142 of the mouse 100 for a user to provide inputs to the processor-based device, which the mouse 100 may be connected to, via clicking of the one or more buttons 122 of the mouse 100. The one or more buttons 122 may include a click button, or a scroll wheel, or a push button, or any combination of suitable buttons. The one or more buttons 122 may be located at any desired region of the cover portion 120 as desired.

According to various embodiments, the base portion 130 of the housing 110 may include a substantially flat section 132 such that the mouse 100 may be placed with an exterior surface of the substantially flat section 132 of the base portion 130 flat against or parallel to a mouse pad, a table top, or any other suitable surfaces on which the mouse may be used. According to various embodiments, the base portion 130 of the housing 110 may include a window 131. The window 131 may be an opening or a transparent portion of the base portion 130. Accordingly, the window 131 may allow the motion detection module 144 to detect relative movement between the mouse 100 and a surface on which the mouse 100 may be placed and moved.

Figure 1C:
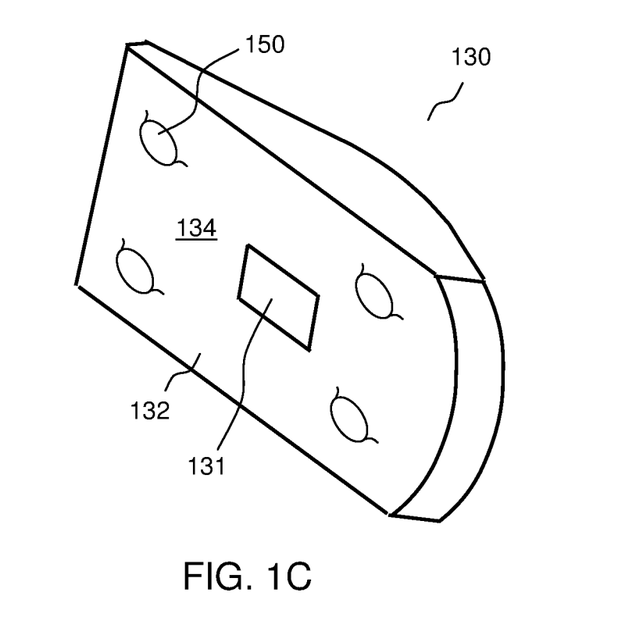
FIG. 1C shows a bottom perspective view of the base portion of the housing of the mouse of FIG. 1A according to various embodiments.
Figure 1D:
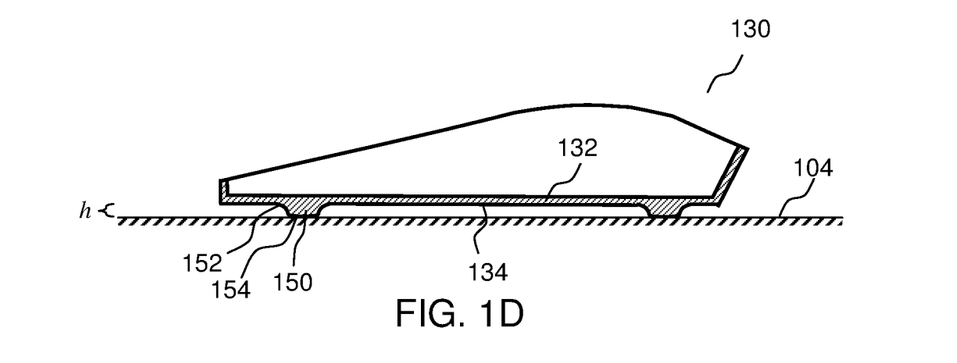
FIG. 1D shows a cross-sectional side view of the base portion of FIG. 1C according to various embodiments.

FIG. 1C shows a bottom perspective view of the base portion 130 of the housing 110 of the mouse 100 according to various embodiments. FIG. 1D shows a cross-sectional side view of the base portion 130 according to various embodiments. As shown, the base portion 130 of the housing 110 of the mouse 100 may include a plurality of mouse foot protrusions 150 integrally molded with the base portion 130 of the housing 110 and forming a portion of the base portion 130 of the housing 110. Accordingly, the base portion 130 of the housing 110 and the plurality of mouse foot protrusions 150 may be molded together as a single unitary component using a single mold such that the plurality of mouse foot protrusions 150 may be an integral part of the base portion 130 of the housing 110. Hence, the base portion 130 of the housing 110 and the plurality of mouse foot protrusions 150 may be molded using one single material or a single compound or a single composite. Thus, the base portion 130 of the housing 110 and the plurality of mouse foot protrusions 150 may be of the same material, compound or composite.

As shown in FIG. 1C, the base portion 130 of the housing 110 of the mouse 100 may include four mouse foot protrusions 150. According to various embodiments, the mouse 100 may include two, or three, or four, or five, or six, or any number of mouse foot protrusions 150. Further, as shown in FIG. 1C, the plurality of mouse foot protrusions 150 may be circular in shape. According to various embodiments, the plurality of mouse foot protrusions 150 may be of a quadrilateral shape, or an oval shape, or an elliptical shape, or a crescent shape, or an annular shape, or any other suitable shapes.

As shown in FIG. 1C and FIG. 1D, the plurality of mouse foot protrusions 150 may be protrusions projecting away from the exterior surface 134 of the substantially flat section 132 of the base portion 130 of the housing 110 such that the plurality of mouse foot protrusions 150 may directly contact the surface 104 on which the mouse 100 may be placed and moved. Accordingly, the plurality of mouse foot protrusions 150 may extend vertically downward from the exterior surface 134 of the substantially flat section 132 of the base portion 130 to support the mouse 100 on the surface 104 which the mouse 100 may be placed and moved. Hence, the plurality of mouse feet protrusions 150 may hold and space the exterior surface 134 of the substantially flat section 132 of the base portion 130 a distance h vertically apart from the surface 104 on which the mouse 100 may be placed and moved. Since the plurality of mouse foot protrusions 150 may be a part of the base portion 130 of the housing 110 of the mouse 100 that may touch or contact the surface on which the mouse 100 may be placed and moved, the plurality of mouse foot protrusions 150 may be configured to facilitate gliding or sliding of the mouse 100 over the surface 104 on which the mouse 100 may be placed and moved to enhance the usability of the mouse 100 on said surface 104.

According to various embodiments, at least one of the plurality of mouse foot protrusions 150 of the base portion 130 of the housing 110 of the mouse 100 may include a curved cross-sectional profile. Accordingly, the at least one of the plurality of mouse foot protrusions 150 may be free of any sharp edges and may only have smooth curved edges. For example, as shown in FIG. 1D, the edge 152 at the transition between the exterior surface 134 of the base portion 130 and the at least one of the plurality of mouse foot protrusions 150 may be a smooth curved edge. Further, a distal tip 154 of the at least one of the plurality of mouse foot protrusions 150 away from the exterior surface 134 of the base portion 130 may also have a smooth curved edge rather than a sharp edge.

According to various embodiments, the at least one of the plurality of mouse foot protrusions 150 may include a rounded apex. Accordingly, the distal tip 154 of the at least one of the plurality of mouse foot protrusions 150 may be a smooth curved surface. The smooth curved surface may minimise the contact area between the at least one of the plurality of mouse foot protrusions 150 and the surface 104 on which the mouse 100 may be placed and moved. Thus, the friction may be reduced between the at least one of the plurality of mouse foot protrusions 150 and the surface on which the mouse 100 may be placed and moved. Hence, the gliding performance or the sliding performance of the mouse 100 may be enhanced.

According to various embodiments, the at least one of the plurality of mouse foot protrusions 150 may include a rounded concave edge between a root of the respective mouse foot protrusion 150 and the exterior surface 134 of the base portion 130 of the housing 110 from which the respective mouse foot protrusion 150 may be projected. Accordingly, the edge 152 at the transition between the exterior surface 134 of the base portion 130 and the mouse foot protrusion 150 may be a rounded concave edge.

According to various embodiments, the mouse 100 may have a seamless integral mouse foot protrusions configuration, wherein the plurality of mouse foot protrusions 150 may be an integral part of the base portion 130 of the housing 110 of the mouse 100. The plurality of mouse foot protrusions 150 may be molded together with the base portion 130 of the housing 110. The plurality of mouse foot protrusions 150 may have only curved edges without any step contour or sharp edges. For example, the plurality of mouse foot protrusions 150 may include smooth raised embossments without any step contours. Advantageously, the plurality of mouse foot protrusions 150 of the mouse 100 may minimise dust trapping at the respective mouse foot protrusions 150. Even if dust may be accumulated at the respective mouse foot protrusions 150, the dust may be cleaned off easily.

According to various embodiments, the plurality of mouse foot protrusions 150 may be made of self-lubricating material, for example self-lubricating plastic. Accordingly, the base portion 130 of the housing 110 or the housing 110 may be made of the same self-lubricating material. According to various embodiments, the self-lubricating material may include solid materials that may possess low friction properties and may be able to slide relative to another surface with minimal applied force and without a liquid lubricant. According to various embodiments, the self-lubricating material may include at least one of acetal resin, polyoxymethylene (POM), Delrin (DuPont, Wilmington, Del.), nylon, polyethylene, polyetherimide, polypropylene, polyetheretherketone (PEEK), polytetrafluoroethylene (PTFE) or Teflon (DuPont, Wilmington, Del.), high molecular weight polyethylene (HMWPE), Ultra High Molecular Weight (UHMW) polyethylene, polyamide-imide (PAI) or TORLON (Solvay Advance Polymers, Alpharetta, Ga.), polyvinylidene fluoride or Kynar (Atochem Corporation), perfluoroalkoxy polymer resin (PFA), or fluorinated ethylene-propylene (FEP).

According to various embodiments, the material of the plurality of mouse foot protrusions 150 may further include an additive. The additive may include a polytetrafluoroethylene powder (Teflon powder). The amount of additive may be about 20 wt % of the material for molding the plurality of mouse foot protrusions 150 and the base portion 130. For example, the Teflon powder may be added to acetal resin for injection molding of the mouse foot protrusions 150 and the base portion 130. The additive may enhance wear resistance and lower friction of the plurality of mouse foot protrusions 150.

According to various other embodiments, the plurality of mouse foot protrusions 150 may be molded with the base portion 130 of the housing 110 via double-shot injection molding. Double-shot injection molding may be a two step molding process. In the first step, an insert may be molded using a first mold, for example an insert providing the base portion 130 of the housing 110 may be molded with the first mold. Subsequently, in the second step, the insert molded in the first step may be place in a second mold such that the second step of molding may mold around the insert to provide the plurality of mouse foot protrusions 150 to the insert. Accordingly, the resultant molded product may be a single piece base portion 130 with the plurality of mouse foot protrusions 150 such that the plurality of mouse foot protrusions 150 may be an integral part of the base portion 130 of the housing 110. Hence, the plurality of mouse foot protrusions 150 may be formed as a portion of the base portion 130 of the housing 110.

According to various embodiments, the order of the double-shot injection molding may be reversed. Accordingly, in the first step, an insert providing the plurality of mouse foot protrusions 150 may be molded using a first mold. Subsequently, in the second step, the insert molded in the first step may be place in a second mold such that the second step of molding may mold around the insert to provide the base portion 130 to the insert. Accordingly, the resultant molded product may be a single piece base portion 130 with the plurality of mouse foot protrusions 150 such that the plurality of mouse foot protrusions 150 may be an integral part of the base portion 130 of the housing 110. Hence, the plurality of mouse foot protrusions 150 may be formed as a portion of the base portion 130 of the housing 110.

According to various embodiments, when molding the base portion 130 with the plurality of mouse foot protrusions 150 via double-shot injection molding, the base portion 130 and the plurality of mouse foot protrusions 150 may be of the same material, such as a self-lubricating material. According to various other embodiments, when molding the base portion 130 with the plurality of mouse foot protrusions 150 via double-shot injection molding, the base portion 130 may be molded with a first material and the plurality of mouse foot protrusions 150 may be molded with a second material. The first material may be a non-self-lubricating material such as acrylonitrile butadiene styrene (ABS) plastic. The second material may be a self-lubricating material. According to various embodiments, the self-lubricating material may include acetal resin, polyoxymethylene (POM), Delrin (DuPont, Wilmington, Del.), nylon, polyethylene, polyetherimide, polypropylene, polyetheretherketone (PEEK), polytetrafluoroethylene (PTFE) or Teflon (DuPont, Wilmington, Del.), high molecular weight polyethylene (HMWPE), Ultra High Molecular Weight (UHMW) polyethylene, polyamide-imide (PAI) or TORLON (Solvay Advance Polymers, Alpharetta, Ga.), polyvinylidene fluoride or Kynar (Atochem Corporation), perfluoroalkoxy polymer resin (PFA), or fluorinated ethylene-propylene (FEP).

Figure 2A:
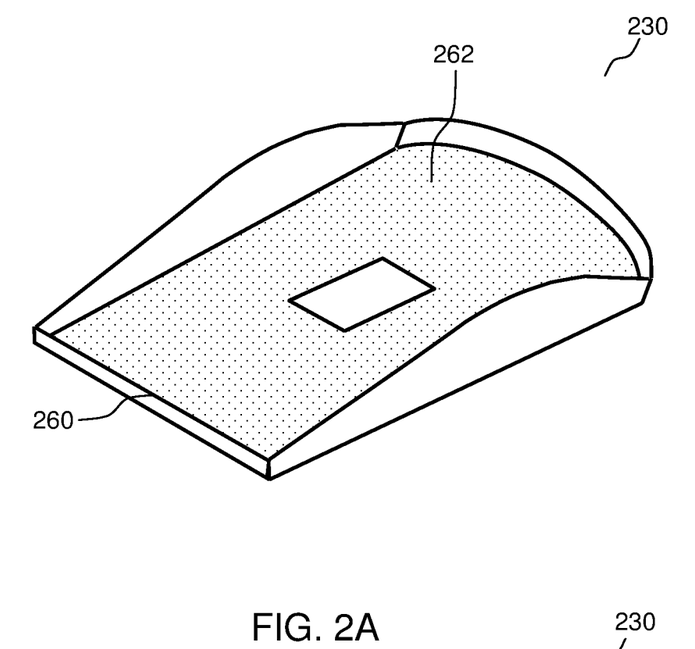
FIG. 2A shows a base portion of a housing of a mouse according to various embodiments.
Figure 2B:
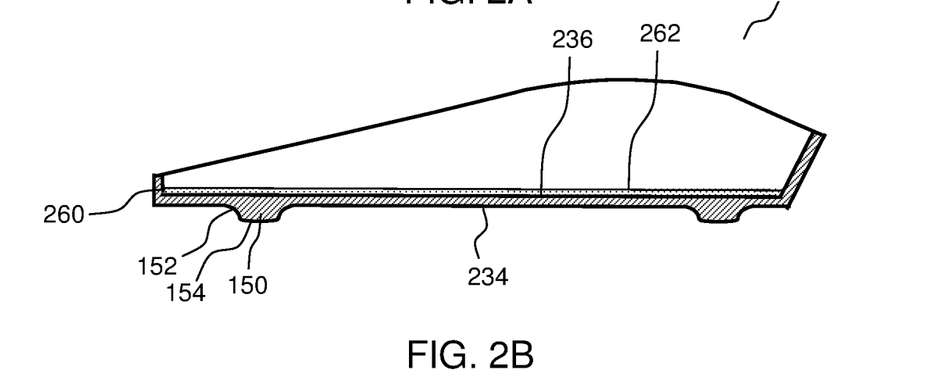
FIG. 2B shows a cross sectional side view of the base portion of FIG. 2A according to various embodiments.
Figure 3A:
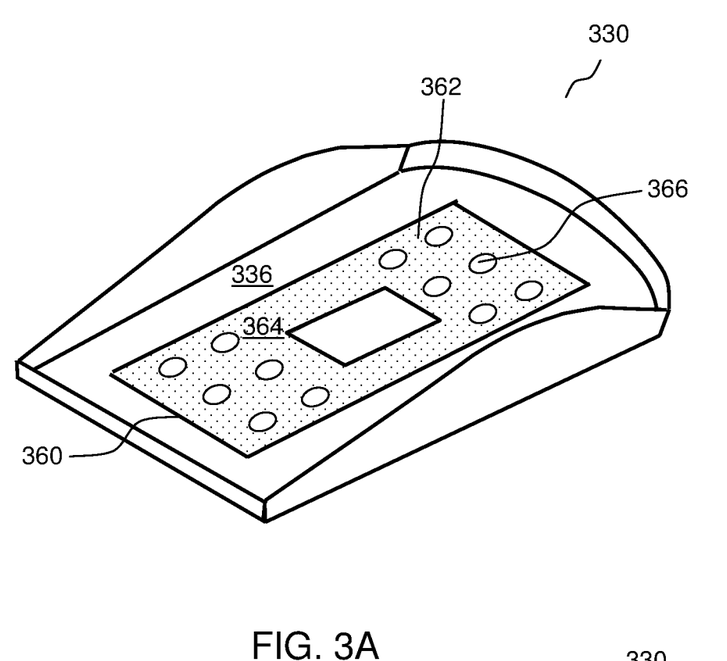
FIG. 3A shows a base portion of a housing of a mouse according to various embodiments.
Figure 3B:
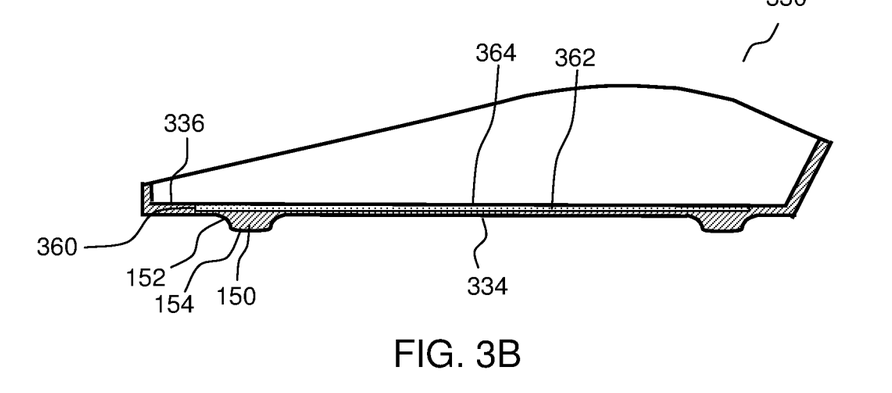
FIG. 3B shows a cross sectional side view of the base portion of FIG. 3A according to various embodiments.
Figure 4:
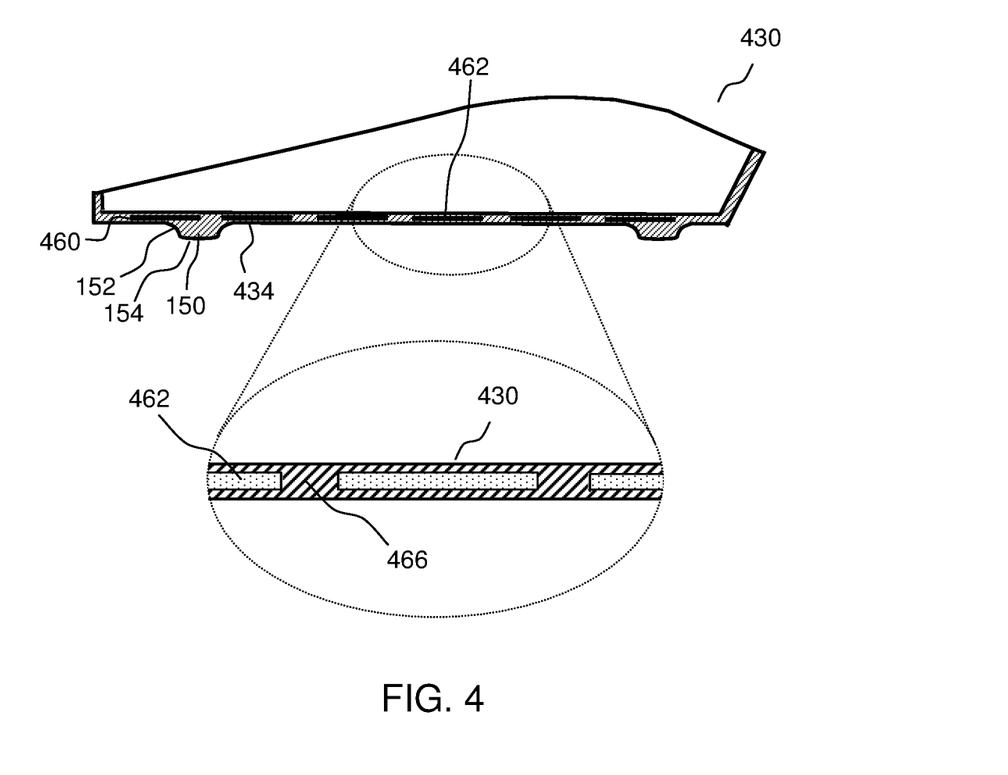
FIG. 4 shows a cross-sectional side view of a base portion and an enlarged view of a portion of the cross-section of the base portion according to various embodiments.

FIG. 2A shows a base portion 230 of a housing of a mouse according to various embodiments. FIG. 2B shows a cross sectional side view of the base portion 230 of FIG. 2A according to various embodiments. FIG. 3A shows a base portion 330 of a housing of a mouse according to various embodiments. FIG. 3B shows a cross sectional side view of the base portion 330 of FIG. 3A according to various embodiments. FIG. 4 shows a cross-sectional side view of a base portion 430 of a housing of a mouse and an enlarged view of a portion of the cross-section of the base portion 430 according to various embodiments.

According to various embodiments, the housing 110 of the mouse 100 may include the base portion 230 as shown in FIG. 2A or the base portion 330 as shown in FIG. 3A or the base portion 430 as shown in FIG. 4. Accordingly, when the mouse 100 includes the base portion 230 of FIG. 2A or the base portion 330 of FIG. 3A or the base portion 430 of FIG. 4, the mouse 100 may further include a layer of metal 260, 360, 460 coupled to the respective base portion 230, 330, 430 of the respective housing. The layer of metal 260, 360, 460 may be connected to an electric reference potential (not shown). The electric reference potential may be located in the electronic circuit module 142 of the mouse 100. For example, the electric reference potential may be an electric potential reference point in a printed circuit board housed in the mouse 100, and the layer of metal 260, 360, 460 may be connected to the electric potential reference point via a wired connection.

According to various embodiments, the electric reference potential may be an electric ground potential. Accordingly, the layer of metal 260, 360, 460 may be grounded by connecting to the electric ground potential. According to various embodiments, the electric ground potential may be an electric common return path located in the electronic circuit module 142 in the mouse 100. For example, it may be an electric common return path located at a printed circuit board housed in the mouse 100, and the layer of metal 260, 360, 460 may be connected to the electric common return path via a wired connection.

As shown in FIGS. 2A and 2B, the layer of metal 260 may include a metal coating 262 coated on at least a portion of a surface 236 of the base portion 230 directed towards the inner portion of the housing. The inner portion of the housing may be the inner cavity or space enclosed by the housing. Accordingly, at least a portion of an interior surface 236 of the base portion 230 of the housing that is facing the inner cavity or space may be metallized. The coating or metallizing of the interior surface 236 of the base portion 230 may be via plating, spraying, casting, or other suitable processes. According to various embodiments, the metal coating 262 may be connected to the electric reference potential, for example the electric ground potential.

As shown in FIGS. 3A and 3B, the layer of metal 360 may include a metal plate 362 embedded in at least a portion of the base portion 330 directed towards the inner portion of the housing. According to various embodiments, the metal plate 362 may be embedded such that at least a portion of a surface 364 of the metal plate 362 may be exposed from at least a portion of an interior surface 336 of the base portion 360 of the housing 110 to face the inner cavity or space enclosed by the housing 110. According to various embodiments, the exposed surface 364 of the metal plate 362 may then be connected to the electric reference potential, for example the electric ground potential.

As shown in FIG. 4, the layer of metal 460 may include a metal plate 462 fully embedded in at least a portion of the base portion 430. According to various embodiments, the metal plate 462 may be embedded such that the metal plate 462 may be fully encapsulated inside the base portion 360 of the housing 110. According to various embodiments, the metal plate 462 may then be connected to the electric reference potential, for example the electric ground potential, via a wired connection. The wired connection may penetrate into the base portion 360 to connect to the metal plate 462.

According to various embodiments, the metal plate 362, 462 may be embedded in the base portion 330, 430 via overmolding or insert-molding wherein the base portion material may be molded over the metal plate 362, 462. The base portion material may be a plastic material. Accordingly, the metal plate 362, 462 may be placed as an insert in a mold and the plastic material may be injection molded over the metal plate 362, 462.

According to various embodiments, the metal plate 362, 462 may be perforated. Accordingly, the metal plate 362, 462 may include a plurality of holes 366, 466 punctured into the metal plate 362, 462. The plurality of holes 366, 466 of the metal plate 362, 462 may enable better adhesion of the metal plate 362, 462 to the base portion 330, 430. For example, when the base portion 330, 430 is made of plastic material, the plurality of holes of the metal plate 362, 462 may allow the plastic material forming the base portion 330, 430 to mesh with the metal plate 362, 462 for better adherence of the metal plate 362, 462 with the plastic base portion 330, 430 so as to prevent or minimise flaking or peeling away of the plastic base portion 330, 430 from the metal plate 362, 462. According to various embodiments, the pattern of the plurality of holes 366, 466 of the metal plate 362, 462 may be dependent on the shape and the structure of the base portion 330, 430 of the mouse. Accordingly, the pattern of the plurality of holes 366, 466 of the metal plate 362, 462 may be configured to optimize the adhesion of the metal plate 362, 462 to the base portion 330, 430 depending on the shape and the structure of the base portion 330, 430. The plurality of holes 366, 466 may be arranged in a regular pattern or a random pattern or any suitable pattern.

According to various embodiments, the respective base portion 230, 330, 430 may possess anti-static property due to the respective layer of metal 260, 360, 460 that is connected to the electric reference potential, such as the electric ground potential. Accordingly, the respective layer of metal 260, 360, 460 may be grounded to cause the respective base portion 230, 330, 430 to prevent the build up of static electricity or to reduce the effect of static electricity. The anti-static property may prevent the accumulation of dust due to static charges at the respective base portion 230, 330, 430. Accordingly, accumulation of dust at the mouse foot at the respective base portion 230, 330, 430 due to static charges may be reduced or prevented.

According to various embodiments, the base portion 230 of FIG. 2A, the base portion 330 of FIG. 3A and the base portion 430 of FIG. 4 may, similar to the base portion 130 of FIG. 1C and FIG. 1D, further include a plurality of mouse foot protrusions 150 integrally molded with the housing and forming a portion of the respective base portion 230, 330, 430 of the housing. Accordingly, the respective base portion 230, 330, 430 and the respective plurality of mouse foot protrusions 150 may be molded together as a single unitary component using a single mold such that the respective plurality of mouse foot protrusions 150 may be an integral part of the respective base portion 230, 330, 430 as shown in FIG. 2B, FIG. 3B and FIG. 4.

As shown in FIG. 2B, FIG. 3B and FIG. 4, the respective plurality of mouse foot protrusions 150 may be protrusions projecting away from the respective exterior surface 234, 334, 434 of the respective base portion 230, 330, 430 such that the plurality of mouse foot protrusions 150 may directly contact the surface on which the mouse may be placed and moved. Accordingly, the respective plurality of mouse foot protrusions 150 may extend vertically downward from the respective exterior surface 234, 334, 434 of the respective base portion 230, 330, 430 to support the mouse on the surface which the mouse may be placed and moved. Hence, the respective plurality of mouse feet protrusions 150 may hold and space the respective exterior surface 234, 334, 434 of the respective base portion 230, 330, 430 a distance vertically apart from the surface on which the mouse may be placed and moved. Since the respective plurality of mouse foot protrusions 150 may be a part of the respective base portion 230, 330, 430 that may touch or contact the surface on which the mouse may be placed and moved, the plurality of mouse foot protrusions 150 may be configured to facilitate gliding or sliding of the mouse over the surface on which the mouse may be placed and moved to enhance the usability of the mouse on said surface.

According to various embodiments, at least one of the respective plurality of mouse foot protrusions 150 of the respective base portion 230, 330, 430 may include a curved cross-sectional profile. Accordingly, the at least one of the respective plurality of mouse foot protrusions 150 may be free of any sharp edges and may only have smooth curved edges.

According to various embodiments, the at least one of the respective plurality of mouse foot protrusions 150 of the respective base portion 230, 330, 430 may include a rounded apex. Accordingly, the tip 154 of the at least one of the plurality of mouse foot protrusions 150 may be a smooth curved surface.

According to various embodiments, the at least one of the respective plurality of mouse foot protrusions 150 of the respective base portion 230, 330, 430 may include a rounded concave edge 152 between a root of the respective mouse foot protrusion 150 and the respective exterior surface 234, 334, 434 of the respective base portion 230, 330, 430 from which the respective mouse foot protrusion 150 may be projected.

According to various embodiments, the mouse with the base portion 230 of FIG. 2A or the base portion 330 of FIG.

3A or the base portion 430 of FIG. 4 may have a seamless integral mouse foot protrusions configuration, wherein the respective plurality of mouse foot protrusions 150 may be an integral part of the respective base portion 230, 330, 430. The respective plurality of mouse foot protrusions 150 may be molded together with the respective base portion 230, 330, 430. The plurality of mouse foot protrusions 150 may have only curved edges without any step contour or sharp edges. For example, the plurality of mouse foot protrusions 150 may include smooth raised embossments without any step contours. The plurality of mouse foot protrusions 150 may minimise dust trapping at the respective mouse foot protrusions 150. Even if dust may be accumulated at the respective mouse foot protrusions 150, the dust may be cleaned off easily.

According to various embodiments, the respective plurality of mouse foot protrusions 150 of the respective base portion 230, 330, 430 may be made of self-lubricating material, for example self-lubricating plastic. Accordingly, the respective base portion 230, 330, 430 may be made of the same self-lubricating material. According to various embodiments, the self-lubricating material may include solid materials that may possess low friction properties and may be able to slide relative to another surface with minimal applied force and without a liquid lubricant. According to various embodiments, the self-lubricating material may include at least one of acetal resin, polyoxymethylene (POM), Delrin (DuPont, Wilmington, Del.), nylon, polyethylene, polyetherimide, polypropylene, polyetheretherketone (PEEK), polytetrafluoroethylene (PTFE) or Teflon (DuPont, Wilmington, Del.), high molecular weight polyethylene (HMWPE), Ultra High Molecular Weight (UHMW) polyethylene, polyamide-imide (PAI) or TORLON (Solvay Advance Polymers, Alpharetta, Ga.), polyvinylidene fluoride or Kynar (Atochem Corporation), perfluoroalkoxy polymer resin (PFA), or fluorinated ethylene-propylene (FEP).

According to various embodiments, the material of the respective plurality of mouse foot protrusions 150 of the respective base portion 230, 330, 430 may further include an additive. The additive may include a polytetrafluoroethylene powder (Teflon powder). The amount of additive may be about 20 wt % of the material for molding the plurality of mouse foot protrusions 150 and the base portion 230, 330, 430.

According to various other embodiments, the plurality of mouse foot protrusions 150 may be molded with the base portion 230, 330, 430 via double-shot injection molding. Double-shot injection molding may be a two step molding process. For example the base portion 230, 330, 430 may be molded in the first step. Subsequently, in the second step of the molding process, the plurality of mouse foot protrusions 150 molded over the base portion 230, 330, 430. Accordingly, the resultant molded product may be a single piece base portion 230, 330, 430 with the plurality of mouse foot protrusions 150 such that the plurality of mouse foot protrusions 150 may be an integral part of the base portion 230, 330, 430 of the housing 110. Hence, the plurality of mouse foot protrusions 150 may be formed as a portion of the base portion 230, 330, 430. According to various embodiments, the order of the double-shot injection molding may be reversed such that the plurality of mouse foot protrusions 150 may be molded first and the base portion 230, 330, 430 may be molded over the plurality of mouse foot protrusions 150 to form the resultant molded product.

According to various embodiments, when molding the base portion 230, 330, 430 with the plurality of mouse foot protrusions 150 via double-shot injection molding, the base portion 230, 330, 430 and the plurality of mouse foot protrusions 150 may be of the same material, such as a self-lubricating material. According to various other embodiments, when molding the base portion 230, 330, 430 with the plurality of mouse foot protrusions 150 via double-shot injection molding, the base portion 230, 330, 430 may be molded with a first material and the plurality of mouse foot protrusions 150 may be molded with a second material. The first material may be a non-self-lubricating material such as acrylonitrile butadiene styrene (ABS) plastic. The second material may be a self-lubricating material. According to various embodiments, the self-lubricating material may include acetal resin, polyoxymethylene (POM), Delrin (DuPont, Wilmington, Del.), nylon, polyethylene, polyetherimide, polypropylene, polyetheretherketone (PEEK), polytetrafluoroethylene (PTFE) or Teflon (DuPont, Wilmington, Del.), high molecular weight polyethylene (HMWPE), Ultra High Molecular Weight (UHMW) polyethylene, polyamide-imide (PAI) or TORLON (Solvay Advance Polymers, Alpharetta, Ga.), polyvinylidene fluoride or Kynar (Atochem Corporation), perfluoroalkoxy polymer resin (PFA), or fluorinated ethylene-propylene (FEP).

Various embodiments have provided a mouse for communication with a processor-based device that may minimise dust trapping at the mouse foot. Various embodiments have also provided a mouse for communication with a processor-based device that may allow dust to be cleaned off very easily even if dust do accumulate at the mouse foot protrusions.

With the seamless integrated mouse feet configuration, the mouse feet of the mouse according to various embodiments may be actual parts of the bottom case cover of the mouse and may be molded together as a single plastic part. The integrated mouse feet may be configured to be smooth raised embossments without step contours. The bottom case cover of the mouse according to various embodiments may be made of self-lubricating plastics such as acetal or polyoxymethylene (POM). Additives such as, Teflon power (e.g. 20%), may be added to acetal resin for injection molding to increase wear resistance & lower friction. Accordingly, the mouse according to various embodiments may minimise dust trapping at the mouse feet. Even if dust does accumulate at the mouse feet, the dust may be cleaned off very easily.

In addition to prevent dust build up at the mouse feet by having smooth integrated mouse feet contours, the bottom case cover of the mouse according to various embodiments may also be made to be anti-static to prevent dust build up from static charges. The anti-static property may be achieved by having the interior surface of the bottom case cover metallized and grounded, or by forming the bottom case cover of the mouse by overmolding, such as insert-molding, plastic material over a thin perforated metal base that may be grounded.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A mouse for communication with a processor-based device, the mouse comprising:

a housing having a base portion;

a layer of metal coupled to a flat section of the base portion;

a plurality of mouse foot protrusions integrally molded with the housing and forming a portion of the base portion, the plurality of mouse foot protrusions protruding away from an exterior surface of the flat section of the base portion of the housing, wherein the base portion is made of plastic material, wherein the layer of metal is connected to an electric reference potential to cause the base portion to prevent a build up of static electricity in a manner so as to provide an anti-static property to the base portion for preventing or reducing accumulation of dust at the plurality of mouse foot protrusions due to static charges.

2. The mouse as claimed in claim 1, wherein the electric reference potential is an electric ground potential.

3. The mouse as claimed in claim 1, wherein the layer of metal comprises a metal coating coated on at least a portion of a surface of the flat section of the base portion directed towards the inner portion of the housing.

4. The mouse as claimed in claim 1, wherein the layer of metal comprises a metal plate embedded in at least a portion of the flat section of the base portion directed towards the inner portion of the housing.

5. The mouse as claimed in claim 4, wherein the metal plate is perforated.

6. The mouse as claimed in claim 1, wherein at least one of the plurality of mouse foot protrusions comprises a curved cross-sectional profile or a rounded apex.

7. The mouse as claimed in claim 1, wherein at least one of the plurality of mouse foot protrusions comprises a rounded concave edge between a root of the respective mouse foot protrusion and an exterior surface of the base portion from which the respective mouse foot protrusion is projected.

8. The mouse as claimed in claim 1, wherein the plurality of mouse foot protrusions are made of self-lubricating material.

9. The mouse as claimed in claim 8, wherein the self-lubricating material comprises at least one of acetal or polyoxymethylene.

10. The mouse as claimed in claim 8, wherein the material of the plurality of mouse foot protrusions comprises an additive.

11. The mouse as claimed in claim 10, wherein the additive comprises a polytetrafluoroethylene powder.

12. The mouse as claimed in claim 10, wherein the amount of additive is about 20 wt % of the material.

* * * * *